US012759468B2

(12) United States Patent
Moore

(10) Patent No.: US 12,759,468 B2
(45) Date of Patent: Oct. 13, 2026

(54) APPARATUS, SYSTEM, AND METHOD FOR VEHICLE CENTER CONSOLE INSIDE WALL STORAGE

(71) Applicant: Toyota Motor Engineering & Manufacturing North America, Inc., Plano, TX (US)

(72) Inventor: Jaime N. Moore, Ann Arbor, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 489 days.

(21) Appl. No.: 18/225,057

(22) Filed: Jul. 21, 2023

(65) Prior Publication Data

US 2025/0026275 A1 Jan. 23, 2025

(51) Int. Cl.
*B60R 7/04* (2006.01)
*B60R 11/00* (2006.01)

(52) U.S. Cl.
CPC ......... *B60R 7/04* (2013.01); *B60R 2011/0007* (2013.01)

(58) Field of Classification Search
CPC .... B60R 2011/0007; B60R 7/04; B60R 7/005
USPC .......................................... 296/24.34, 37.8
See application file for complete search history.

(56) References Cited

U.S. PATENT DOCUMENTS

| | | | | |
|---|---|---|---|---|
| 6,890,138 | B1 * | 5/2005 | Myrick | B60P 7/0892 410/97 |
| 7,032,945 | B1 * | 4/2006 | Tiesler | B60R 11/02 296/37.7 |
| 7,240,814 | B2 * | 7/2007 | Holmberg | B60R 7/005 220/529 |
| 7,802,831 | B2 * | 9/2010 | Isayama | B60R 13/0262 296/37.8 |
| 8,303,016 | B2 * | 11/2012 | Pauken | B60R 11/02 248/302 |
| 8,480,151 | B2 | 7/2013 | Gaudig et al. | |
| 8,807,408 | B2 | 8/2014 | Kreis | |
| 9,227,571 | B1 | 1/2016 | Wilkens | |

(Continued)

FOREIGN PATENT DOCUMENTS

| | | | |
|---|---|---|---|
| DE | 202004002992 | U1 | 7/2005 |
| DE | 102017215042 | A1 | 3/2018 |
| JP | 10-024770 | A | 1/1998 |

OTHER PUBLICATIONS

KR 10-2021-0051187 and computer translation (Year: 2021).*

*Primary Examiner* — Gregory A Blankenship
(74) *Attorney, Agent, or Firm* — Snell & Wilmer LLP

(57) ABSTRACT

Apparatuses, systems, and methods for a vehicle include a compartment having an edge surrounding a cavity and an inside wall at least partially defining the cavity, a lid coupled to the compartment, and a retainer sized and configured to removably couple to the inside wall. A plurality of wall apertures can be disposed in the inside wall. The wall apertures can be configured to receive an attachment feature for securing the retainer to the inside wall. The retainer can be selectively disposed at various wall apertures for configuring a position of the retainer with respect to the inside wall for retaining one or more items in the cavity. The retainer can subdivide the cavity.

18 Claims, 4 Drawing Sheets

(56) References Cited

U.S. PATENT DOCUMENTS

| | | | | | |
|---|---|---|---|---|---|
| 9,238,439 | B2 | 1/2016 | Huebner et al. | | |
| 9,387,808 | B2 | 7/2016 | Kearney et al. | | |
| 10,029,619 | B2 | 7/2018 | Sahs et al. | | |
| 10,328,834 | B2 | 6/2019 | Kelat | | |
| 10,850,671 | B2 | 12/2020 | Koehler et al. | | |
| 10,899,263 | B2 | 1/2021 | Schnur et al. | | |
| 10,906,469 | B2 | 2/2021 | Smolik et al. | | |
| 12,441,225 | B2 * | 10/2025 | Endlich | B60N 3/101 | |
| 2005/0224509 | A1 * | 10/2005 | Dry | B60N 3/107 | 220/849 |
| 2005/0236859 | A1 * | 10/2005 | Sakakibara | B60R 7/04 | 296/37.8 |
| 2008/0169667 | A1 * | 7/2008 | Siniarski | B60R 7/082 | 296/37.8 |
| 2009/0174208 | A1 * | 7/2009 | Lota | B60R 7/04 | 296/37.8 |
| 2009/0267375 | A1 * | 10/2009 | Vander Sluis | B60N 2/787 | 296/37.8 |
| 2011/0074173 | A1 | 3/2011 | Gaudig et al. | | |
| 2012/0261936 | A1 * | 10/2012 | Spitler | B60R 7/04 | 296/24.34 |
| 2014/0197657 | A1 * | 7/2014 | Gillis | B60N 3/101 | 296/37.8 |
| 2015/0035308 | A1 * | 2/2015 | Huebner | B60R 11/0252 | 296/37.8 |
| 2016/0250981 | A1 * | 9/2016 | Felkins | B60R 7/06 | 296/37.8 |
| 2020/0148130 | A1 * | 5/2020 | Palaka | H02J 7/0042 | |
| 2020/0247323 | A1 * | 8/2020 | Smolik | B60N 2/793 | |
| 2020/0307466 | A1 * | 10/2020 | Pliego | B60R 16/02 | |
| 2022/0176882 | A1 * | 6/2022 | Smolik | B60R 11/00 | |
| 2023/0119742 | A1 * | 4/2023 | Lee | B60R 11/00 | 296/37.8 |
| 2023/0202371 | A1 * | 6/2023 | Jung | F25B 21/04 | 296/37.8 |
| 2024/0208426 | A1 * | 6/2024 | Harmon | B60R 7/08 | |
| 2025/0026274 | A1 * | 1/2025 | Moore | B60R 7/08 | |
| 2025/0026275 | A1 * | 1/2025 | Moore | B60R 7/04 | |
| 2025/0074329 | A1 * | 3/2025 | Porcs | B60R 11/02 | |

* cited by examiner

APPARATUS, SYSTEM, AND METHOD FOR VEHICLE CENTER CONSOLE INSIDE WALL STORAGE

BACKGROUND

Field

The present disclosure relates to apparatuses, systems, and methods for vehicle center console storage and, more particularly, to apparatuses, systems, and methods for organizing storage within a vehicle center console.

Description of the Related Art

Storage space within modern vehicles is at a premium. One area within vehicles which has become more utilized is the center console, typically located between two front or rear bucket seats. The size of the center console varies based on the size of the vehicle's passenger compartment. Many center consoles are designed large enough to store a number of items. Existing center consoles typically define a single open space. The size and shape of the center console varies, and often turns into a "junk drawer." Looking at different vehicles over the years, there have been various types of features that have been used to try and organize and make sense of the center console space. The depth of the box tends to make it difficult to organize or make the space useful so that important items are organized and easy to find. Some designs result in the loss of use of remaining space within the console due to the geometry of the console (e.g., the width and/or depth). For example, in the case of a single open space, because multiple items tend to be stacked, it becomes difficult to reach the lowest items. As a result, multiple items are not conveniently stored within the single open space. Moreover, items placed within the open space have a tendency to move around and get jostled during operation of the vehicle.

Accordingly, there is a need for a system and a method for providing organization and ease of access to a vehicle center console.

SUMMARY

Described herein is an apparatus for a vehicle. The apparatus includes a compartment having an edge surrounding a cavity and an inside wall at least partially defining the cavity, a lid coupled to the compartment, the lid including an inner surface sized to span over the cavity and at least partially enclose the compartment, and a retainer sized and configured to removably couple to the inside wall.

In various embodiments, the retainer can be configured to be suspended from the inside wall. The retainer can at least partially define an opening for receiving one or more items to be stored in the compartment. The inner surface of the lid can be disposed at the opening of the retainer in response to the lid moving to a closed position, whereby the one or more items are blocked from exiting the retainer. The apparatus can further include a plurality of wall apertures disposed in the inside wall and a plurality of attachment features. Each wall aperture of the plurality of wall apertures is configured to receive an attachment feature of the plurality of attachment features for securing the retainer to the inside wall. Each attachment feature of the plurality of attachment features can include a clamping member configured to clamp to the inside wall. A first attachment feature of the plurality of attachment features can include a first projection extending from the retainer and a second projection extending from the first projection at an angle, wherein the first projection is configured to extend through a first wall aperture of the plurality of wall apertures when the first attachment feature is in an installed position.

Each attachment feature of the plurality of attachment features can be a rubber button fastener configured to attach the retainer to the inside wall. Each rubber button fastener can include a first flange, a second flange, and a third flange. The inside wall is configured to be received between the first flange and the second flange, and an attachment portion of the retainer is configured to be received between the second flange and the third flange. The apparatus can further include a plurality of wall apertures disposed in the inside wall, and the retainer includes an attachment feature configured to be received by each of the plurality of wall apertures, whereby the retainer is configurable between a plurality of positions with respect to the inside wall. The retainer can be a strap.

Also described is a vehicle center console. The vehicle center console includes a compartment having an edge surrounding a cavity and an inside wall at least partially defining the cavity, a lid coupled to the compartment, the lid including an inner surface sized to span over the cavity and at least partially enclose the cavity, a plurality of wall apertures disposed in the inside wall, and a retainer sized and configured to removably couple to the inside wall via the plurality of wall apertures.

In various embodiments, the vehicle center console can further include a rubber button fastener configured to couple to the inside wall via a first wall aperture of the plurality of wall apertures, whereby the retainer is configured to removably couple to the inside wall. The retainer can include a plurality of retainer apertures, the rubber button fastener configured to couple to the retainer via a first retainer aperture of the plurality of retainer apertures. The retainer can include a first attachment feature configured to be received by a first wall aperture of the plurality of wall apertures, whereby the retainer is configured to removably couple to the inside wall. The first attachment feature can include a clamping member configured to clamp to the inside wall at the first wall aperture. The first attachment feature can include a first projection extending from the retainer and a second projection extending from the first projection at an angle, wherein the first projection is configured to extend through the first wall aperture when the first attachment feature is in an installed position. The first attachment feature can be further configured to be received by a second wall aperture of the plurality of wall apertures, and the first attachment feature is moveable between the first wall aperture and the second wall aperture to adjust a position of the retainer.

Moreover, also described is a method including disposing a first end of an attachment feature in a wall aperture disposed in an inside wall of a center console compartment, positioning a second end of the attachment feature to extend into a cavity of the center console compartment, and disposing the second end of the attachment feature to extend through an aperture disposed in a retainer.

In various embodiments, the method further includes securing the retainer to the inside wall with the attachment feature.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale and may be exaggerated to better illustrate the important features of the present invention. In the drawings, like reference numerals designate like parts throughout the different views, wherein:

DETAILED DESCRIPTION

The present disclosure describes apparatuses, systems, and methods for center console storage for a vehicle. For instance, a modular center console retainer can hold items of importance to a user. Different retainers may be developed and specifically sized to hold various items, such as DVDs, CDs, wallets, a small purse, snacks, smart phones, toiletries, medicine, etc. Apparatuses, systems, and methods optimize the space within a center console by creating a readily accessible container/retainer at the inside wall of the center console. Apparatuses, systems, and methods can hold items sufficiently in place in the respective retainer(s) during reasonable driving conditions (e.g., vehicle acceleration and/or deceleration) so as to meet user expectations. Apparatuses, systems, and methods can allow for the retainer(s) to be removed and replaced by the user a reasonable number of times. Apparatuses, systems, and methods can meet environmental test requirements under load without breaking or warping significantly so as to meet user expectations.

Apparatuses, systems, and methods include a storage module (referred to herein as a retainer) for securing one or more items within the retainer and to an inside wall of the center console. The retainer can be removably coupled to the center console using a plurality of attachment features (e.g., a clamping member and/or a rubber button fastener). The center console inside wall can be configured with a plurality of wall apertures (e.g., a "bulletin board" style of holes, hooks, or buttons) whereby one or more retainers are configurable between a plurality of positions as desired. In this manner, a user can install the retainer in a position relative to the center console as desired. Moreover, a user can install multiple retainers of various types, shapes, sizes, etc. as desired to secure various items to the inside wall of the center console.

Figure 1A:
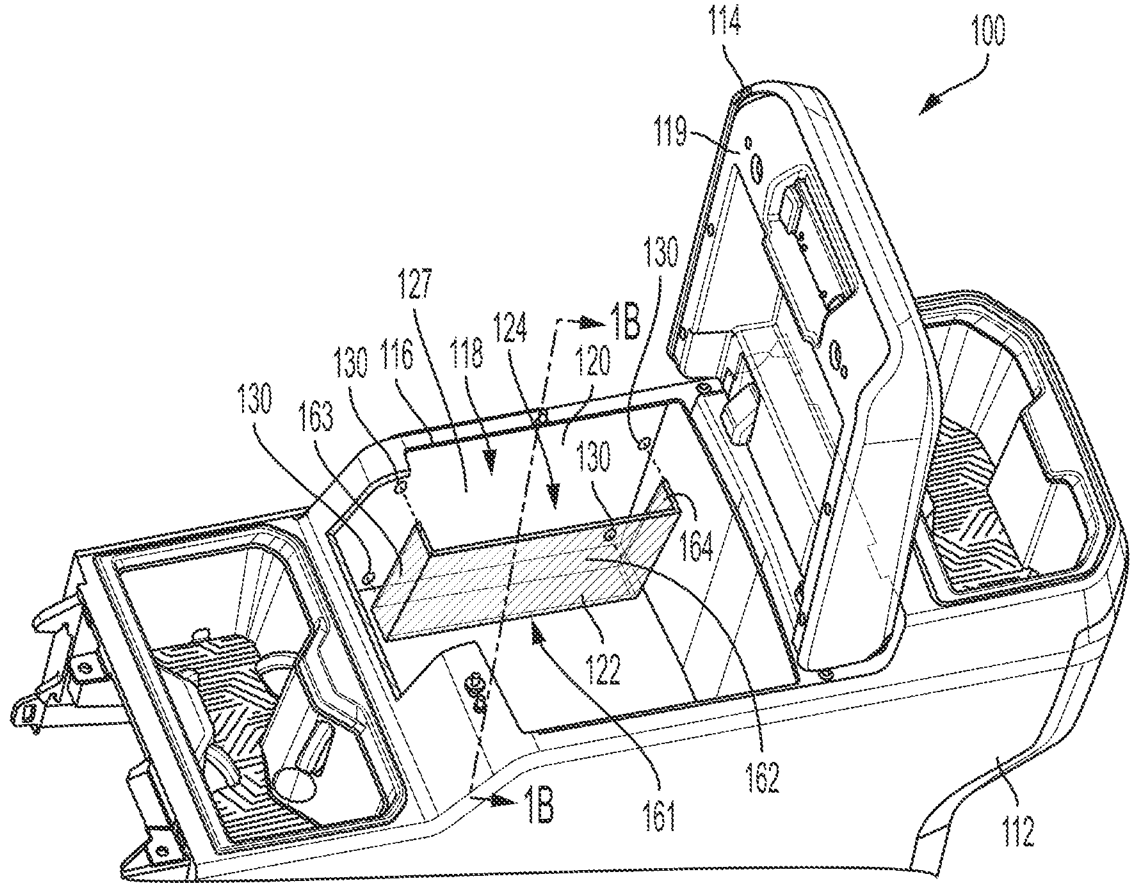
FIG. 1A is a schematic fragmentary, assembly view of a vehicle center console with a removable retainer according to an embodiment of the present disclosure.

Referring to the drawings, wherein like reference numbers correspond to like or similar components throughout the several figures. FIG. 1A generally shows an apparatus for a vehicle having a center console 100 that includes a compartment 112 and a lid 114 coupled to the compartment 112. The lid 114 can be pivotally coupled to the compartment 112. The compartment 112 has an edge 116 surrounding a cavity 118. The lid 114 can include an inner surface 119 sized to span over the cavity 118 and enclose the compartment 112. The compartment 112 includes one or more inside walls 120 at least partially defining the cavity 118 and at least partially enclosing the compartment 112. A retainer 122 is sized and configured to removably couple to the inside wall 120. In this manner, when coupled to the inside wall 120, the retainer 122 can secure one or more items 125 in an organized and readily accessible manner. The retainer 122 can be configured as a hanging storage module. In this regard, the retainer 122 can subdivide the cavity 118 for organizational storage of items.

Figure 1B:
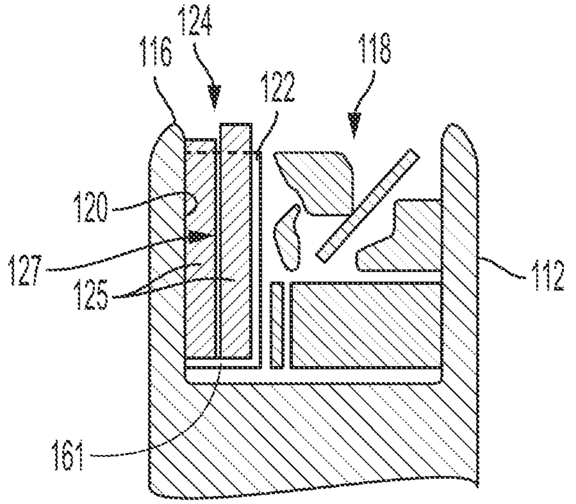
FIG. 1B is a section view taken along line A-A of the vehicle center console and removable retainer of FIG. 1A according to an embodiment of the present disclosure.

With combined reference to FIG. 1A and FIG. 1B, the retainer 122 can be configured to be suspended from the inside wall 120. The retainer 122 at least partially defines an opening 124 for receiving one or more items 125 into a space 127 between the inside wall 120 and the retainer 122 to be stored in the compartment 112. Stated differently, the retainer 122 at least partially defines an opening 124 for receiving one or more items into a receptacle at least partially defined by the retainer 122. In various embodiments, the receptacle is defined by the retainer 122 and the inside wall 120.

In various embodiments, the opening 124 is an upward facing opening when the lid 114 is in an open position as illustrated but the opening 124 could also be sideways facing. The retainer 122 can define sidewalls for retaining the one or more items 125. In this manner, the one or more items 125 are secured from exiting the retainer 122 during various driving conditions (e.g., acceleration and/or deceleration). In response to the lid 114 moving to an open position, the opening 124 can be revealed and any items located in the retainer 122 can be readily accessed by a user. In various embodiments, the inner surface 119 can block the opening 124 in response to the lid 114 moving to a closed position to prevent the one or more items 125 from exiting the retainer 122.

The retainer 122 can be a rigid structure made from a plastic material, a composite material, a fiber-reinforced material, and/or a metal material, among others, as desired. The retainer 122 can be configured to flex relative to the inside wall 120 for accommodating more or less items 125 as desired. In some embodiments, the retainer 122 can include one or more flexible members, such as a textile strap, a rope, a cord, or the like.

The retainer 122 can include a first wall 161 (also referred to herein as a first side portion) extending from the inside wall 120 and at least partially defining a back or bottom surface of the opening 124. The first wall 161 can include a substantially rectangular geometry in various embodiments. The retainer 122 can further include a second wall 162 (also referred to herein as a central portion) extending from the first wall 161 toward the opening 124. The second wall 162 can extend from the first wall 161 to the opening 124. The second wall 162 can include a substantially rectangular geometry in various embodiments. The second wall 162 can be oriented substantially perpendicular to the first wall 161 in various embodiments. The second wall 162 can be oriented substantially parallel to the inside wall 120 in various embodiments. The retainer 122 can further include a third wall 163 extending from the second wall 162 toward the inside wall 120. The third wall 163 can further extend from the first wall 161. The third wall 163 can extend from the first wall 161 to the opening 124. The third wall 163 can extend from the second wall 162 to the inside wall 120. The third wall 163 can have a substantially rectangular geometry in various embodiments. The third wall 163 can be oriented substantially perpendicular to the inside wall 120 and/or the second wall 162 in various embodiments. The retainer 122 can further include a fourth wall 164 extending from the second wall 162 toward the inside wall 120. The fourth wall 164 can further extend from the first wall 161. The fourth wall 164 can extend from the first wall 161 to the opening 124. The fourth wall 164 can extend from the second wall 162 to the inside wall 120. The fourth wall 164 can have a substantially rectangular geometry in various embodiments. The fourth wall 164 can be oriented substantially perpendicular to the inside wall 120 and/or the second wall 162 in various embodiments. The fourth wall 164 can be oriented substantially parallel to the third wall 163 in various embodiments.

In various embodiments, one or more attachment features (e.g., the attachment feature 132 (see FIG. 2A and FIG. 2B) and/or the attachment feature 240 (see FIG. 3A and FIG. 3B)) extend from the third wall 163 whereby the retainer 122 is coupled to the compartment 112. Similarly, one or more attachment features (e.g., the attachment feature 132 (see FIG. 2A and FIG. 2B) and/or the attachment feature 240 (see FIG. 3A and FIG. 3B)) can extend from the fourth wall 164 whereby the retainer 122 is coupled to the compartment 112. In this regard, the retainer 122 can include one or more attachment features (e.g., the attachment feature 132) formed integrally therewith, in accordance with various embodiments. In various embodiments, the attachment features (e.g., the attachment feature 240) are removably coupled to the retainer 122. In various embodiments, the inside wall 120 includes a plurality of apertures 130 (also referred to herein as wall apertures). Each aperture 130 can be sized and configured to receive an attachment feature for coupling the retainer 122 to the inside wall 120.

Figures 2A, 2B:
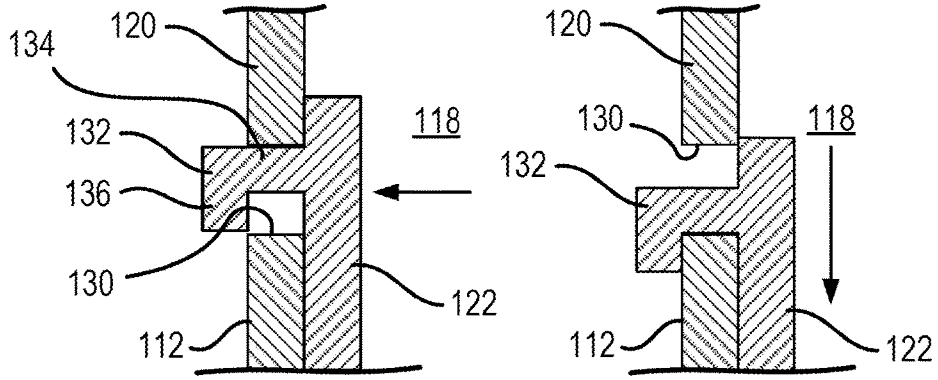
FIG. 2A and FIG. 2B are schematic, fragmentary views of a retainer being installed onto a lid with an integral attachment feature according to an embodiment of the present disclosure.

With reference to FIG. 2A and FIG. 2B, the retainer 122 can include an attachment feature 132 (also referred to herein as a clamping member) formed integrally therewith. The attachment feature 132 can include a hook-like or a clamp-like feature including a first projection 134 extending from the retainer 122 and a second projection 136 extending from the first projection 134. The first projection 134 can extend through the wall aperture 130. The second projection 136 can extend at an angle with respect to the first projection 134. For example, the second projection 136 can extend at an angle of between about 45 degrees and 135 degrees in various embodiments, at an angle of between about 85 degrees and 95 degrees in various embodiments, and at an angle of between about 89 degrees and 91 degrees in various embodiments, with respect to the first projection 134. The second projection 136 can extend orthogonally with respect to the first projection 134 in various embodiments. The inside wall 120 can be compressed between the second projection 136 and the retainer 122 when the retainer 122 is installed on the inside wall 120. To install the retainer 122, the second projection 136 can be inserted through the wall aperture 130 and slid sideways such that a portion of the inside wall 120 is located between the second projection 136 and the retainer 122 and the first projection 134 extends through the wall aperture 130 (see FIG. 2B). In this manner, the attachment feature 132 can clamp to the compartment 112 at the inside wall 120.

Figures 3A, 3B:
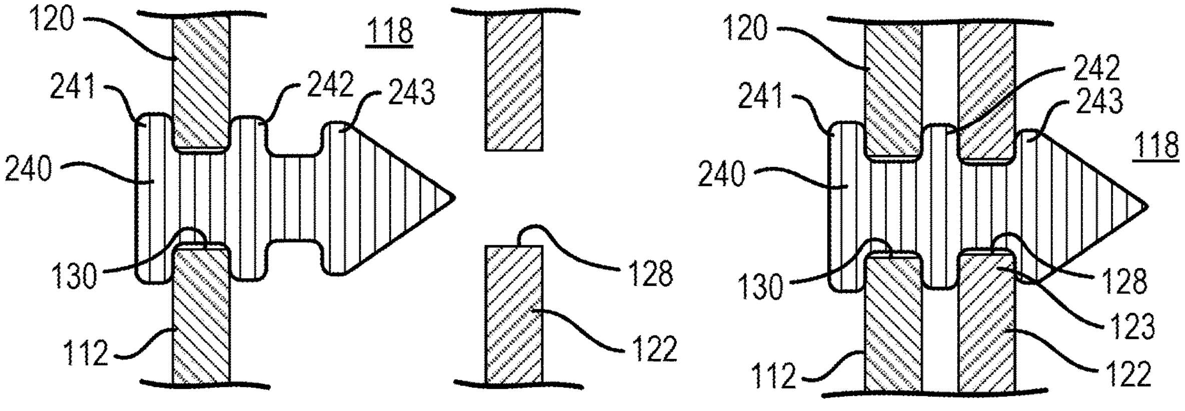
FIG. 3A and FIG. 3B are schematic, fragmentary views of a retainer being installed onto a lid with a removable attachment feature according to an embodiment of the present disclosure.

With reference to FIG. 3A and FIG. 3B, the attachment feature 240 can be a separate member from the retainer 122. In various embodiments, the retainer 122 is coupled to the inside wall 120 via one or more attachment features 240. The attachment feature 240 can be a rubber button fastener in various embodiments. The attachment feature 240 can include a generally cylindrical body having a plurality of flanges extending therefrom, as described in further detail herein. The attachment feature 240 can be made of a rubber material and can include a first portion configured to momentarily deform (e.g., due to its soft, elastic rubber material) to be placed in the wall aperture 130 and a second portion configured to momentarily deform to be placed in an aperture 128 disposed in the retainer 122. For example, the attachment feature 240 can include a first flange 241 at a first end thereof and a second flange 242 at a middle portion thereof. The first flange 241 can deform to fit through the wall aperture 130 and then return to its original (or near original) shape to secure the inside wall 120 between the first flange 241 and the second flange 242. In this regard, a distance between the first flange 241 and the second flange 242 can correspond to a thickness of the inside wall 120. The distance between the first flange 241 and the second flange 242 can be equal to the thickness of the inside wall 120 when the attachment feature 240 is installed on the inside wall 120. For example, the first flange 241 and the second flange 242 can apply a compressing force on the inside wall 120 when in the installed position to secure the attachment feature 240 in place. The second flange 242 can rest against the inside wall 120. In various embodiments, the attachment feature 240 can be pre-installed on the inside wall 120 such that the retainer 122 need only be placed over the attachment feature 240 by a user to install the retainer 122 to the inside wall 120.

The attachment feature 240 can further include a third flange 243 at a second end thereof, opposite the first end. In this manner, the second flange 242 can be located between the first flange 241 and the third flange 243. The retainer 122 can be installed over the attachment feature 240 by moving the third flange 243 through the aperture 128 such that an attachment portion 123 of the retainer 122 is located between the second flange 242 and the third flange 243. Similar to the first flange 241 and the second flange 242, the third flange 243 can deform to fit through the aperture 128 and then return to its original (or near original) shape to secure the retainer 122 between the third flange 243 and the second flange 242. In this regard, a distance between the third flange 243 and the second flange 242 can correspond to a thickness of the attachment portion 123 of the retainer 122. The distance between the third flange 243 and the second flange 242 can be equal to the thickness of the attachment portion 123 of the retainer 122 when the attachment feature 240 is installed on the retainer 122. For example, the third flange 243 and the second flange 242 can apply a compressing force on the attachment portion 123 of the retainer 122 when in the installed position to secure the retainer 122 in place with respect to the inside wall 120. The second flange 242 can rest against the retainer 122. The third flange 243 can rest against the retainer 122. In various embodiments, the attachment feature 240 can be pre-installed on the retainer 122 such that the attachment feature 240 need only be placed into the wall aperture 130 to install the retainer 122 to the inside wall 120. In various embodiments, the third flange 243 can be tapered to assist with moving the retainer 122 over the third flange 243 to the installed position. Although illustrated in FIG. 3A and FIG. 3B as being installed first on the inside wall 120 and then the retainer 122 being installed over the attachment feature 240, the inside wall 120 and the retainer 122 can be swapped (i.e., the attachment feature 240 can be installed first on the retainer 122 and then the attachment feature 240 attached to the inside wall 120) without departing from the scope of the present disclosure.

Figure 4:
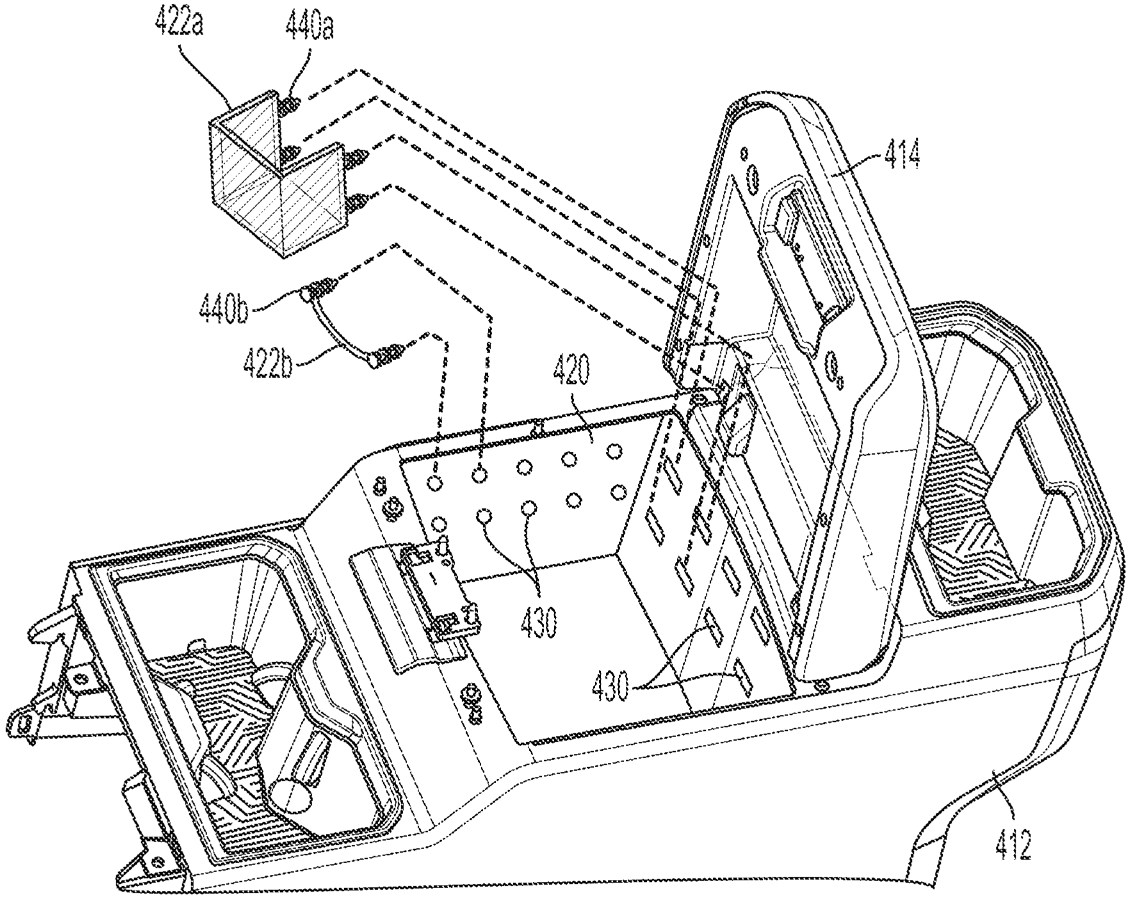
FIG. 4 is a schematic fragmentary, assembly view of a vehicle center console container having a plurality of wall apertures and a plurality of retainers for modular center console storage according to an embodiment of the present disclosure.

With reference to FIG. 4, an assembly view of a first retainer 422*a* and a second retainer 422*b* with respect to a compartment 412 having a plurality of apertures 430 (also referred to herein as wall apertures) disposed in an inside wall 420 thereof is illustrated, in accordance with various embodiments. Attachment features 440*a* of first retainer 422*a* can be configured to be received by the apertures 430, whereby the retainer 422*a* is configurable between a plurality of positions with respect to the inside wall 420. Stated differently, the retainer 422*a* can be configurable between various positions as desired by a user. In this regard, the apertures 430 can be disposed in a grid-like manner (e.g., having a plurality of rows and columns). Similarly, attachment features 440*b* of retainer 422*b* can be configured to be received by the apertures 430, whereby the retainer 422*b* is configurable between a plurality of positions with respect to the inside wall 420. Stated differently, the retainer 422*b* can be configurable between various positions as desired by a user. In various embodiments, the retainer 422*a* includes a bin. In various embodiments, the retainer 422*b* includes a strap (e.g., a textile fabric, a cord, etc.).

Figure 5:
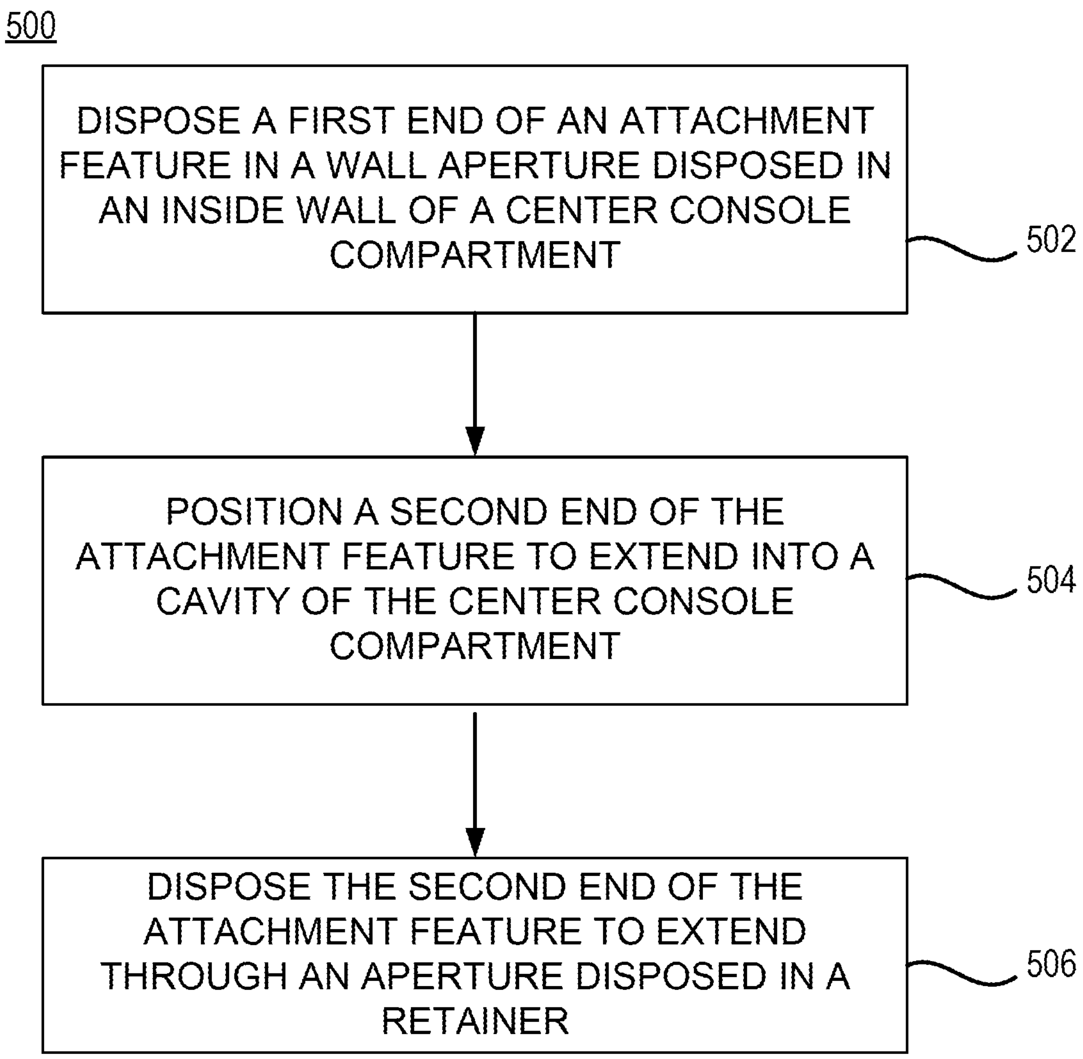
FIG. 5 is a flowchart illustrating a method for installing a retainer to a sidewall of a center console container according to an embodiment of the present disclosure.

With reference to FIG. 5, a flowchart illustrating a method 500 is provided. In various embodiments, the method 500 is a method for subdividing a center console compartment of a vehicle. In various embodiments, the method 500 is a method for installing a retainer to a sidewall of a center console container. For ease of description, the method 500 is described below with reference to FIG. 3A and FIG. 3B. The method 500 of the present disclosure, however, is not limited to use of the exemplary center console 100 of FIG. 3A and FIG. 3B.

In step 502, the method 500 includes disposing a first end of the attachment feature 240 in the wall aperture 130 disposed in the inside wall 120 of the center console compartment 112.

In step 504, the method 500 includes positioning a second end of the attachment feature 240 to extend into the cavity 118 of the center console compartment 112.

In step 506, the method 500 includes disposing the second end of the attachment feature 240 to extend through the aperture 128 disposed in the retainer 122.

In various embodiments, the method 500 further includes suspending the retainer 122 from the inside wall 120 with the attachment feature 240. In various embodiments, steps 502 through 506 can be repeated to attach the retainer 122 to the inside wall 120 via a plurality of attachment features 240. Moreover, steps 502 through 506 can be performed in the reverse order (i.e., the attachment feature 240 can first be attached to the retainer 122 and subsequently attached to the inside wall 120).

Where used throughout the specification and the claims, "at least one of A or B" includes "A" only, "B" only, or "A and B." Exemplary embodiments of the apparatuses, the systems, and the methods described herein have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments (e.g., including a singular element where multiple elements are described and/or multiple elements where a singular element is described, etc.) that reasonably fall within the scope of the advancement to the art hereby contributed, and that that scope shall not be restricted, except in light of the appended claims and their equivalents.

What is claimed is:

1. An apparatus for a vehicle, the apparatus comprising:

a compartment having an edge surrounding a cavity and an inside sidewall at least partially defining the cavity, the inside sidewall including a plurality of wall apertures disposed therein;

a lid coupled to the compartment, the lid including an inner surface sized to span over the cavity and at least partially enclose the compartment; and a retainer sized and configured to removably couple to the inside sidewall via a plurality of attachment features, each attachment feature of the plurality of attachment features being configured to be received through the inside sidewall via a corresponding wall aperture of the plurality of wall apertures to secure the retainer to the inside sidewall;

wherein each attachment feature of the plurality of attachment features includes at least one of:

a clamping member configured to clamp to the inside sidewall; or a rubber button fastener configured to couple the retainer to the inside sidewall, wherein each rubber button fastener includes a first flange, a second flange, and a third flange, the inside sidewall is configured to be received between the first flange and the second flange, and an attachment portion of the retainer is configured to be received between the second flange and the third flange.

2. The apparatus of claim 1, wherein the retainer is configured to be suspended from the inside sidewall.

3. The apparatus of claim 2, wherein the retainer at least partially defines an opening for receiving one or more items to be stored in the compartment.

4. The apparatus of claim 3, wherein the inner surface of the lid is disposed at the opening of the retainer in response to the lid moving to a closed position, whereby the one or more items are blocked from exiting the retainer.

5. The apparatus of claim 1, wherein a first attachment feature of the plurality of attachment features includes:

a first projection extending from the retainer; and a second projection extending from the first projection at an angle, wherein the first projection is configured to extend through a first wall aperture of the plurality of wall apertures when the first attachment feature is in an installed position.

6. The apparatus of claim 1, wherein the retainer includes a first attachment feature of the plurality of attachment features, the first attachment feature is configured to be received by each of the plurality of wall apertures, whereby the retainer is configurable between a plurality of positions with respect to the inside sidewall.

7. The apparatus of claim 1, wherein the retainer comprises a strap.

8. The apparatus of claim 3, wherein the inside sidewall at least partially defines the opening.

9. The apparatus of claim 1, wherein the plurality of wall apertures are vertically spaced on the inside sidewall.

10. The apparatus of claim 1, wherein the plurality of wall apertures are disposed in a single, common plane.

11. A vehicle center console, comprising:

a compartment having an edge surrounding a cavity and an inside sidewall at least partially defining the cavity;

a lid coupled to the compartment, the lid including an inner surface sized to span over the cavity and at least partially enclose the cavity;

a plurality of wall apertures disposed in the inside sidewall;

a retainer sized and configured to removably couple to the inside sidewall via the plurality of wall apertures, each wall aperture of the plurality of wall apertures being configured to receive an attachment feature through the inside sidewall to secure the retainer to the inside sidewall;

wherein the attachment feature includes at least one of:

a clamping member configured to clamp to the inside sidewall; or a rubber button fastener configured to couple the retainer to the inside sidewall, wherein each rubber button fastener includes a first flange, a second flange, and a third flange, the inside sidewall is configured to be received between the first flange and the second flange, and an attachment portion of the retainer is configured to be received between the second flange and the third flange.

12. The vehicle center console of claim 11, wherein the attachment feature includes the rubber button fastener, and the rubber button fastener is configured to couple to the inside sidewall via a first wall aperture of the plurality of wall apertures, whereby the retainer is configured to removably couple to the inside sidewall; and the retainer includes a plurality of retainer apertures, the rubber button fastener is configured to couple to the retainer via a first retainer aperture of the plurality of retainer apertures.

13. The vehicle center console of claim 11, wherein the retainer includes the attachment feature configured to be received by a first wall aperture of the plurality of wall apertures, whereby the retainer is configured to removably couple to the inside sidewall.

14. The vehicle center console of claim 13, wherein the attachment feature includes the clamping member configured to clamp to the inside sidewall at the first wall aperture, and the clamping member includes a first projection extending from the retainer and a second projection extending from the first projection at an angle, wherein the first projection is configured to extend through the first wall aperture when the attachment feature is in an installed position.

15. The vehicle center console of claim 13, wherein the attachment feature is further configured to be received by a second wall aperture of the plurality of wall apertures, and the attachment feature is moveable between the first wall aperture and the second wall aperture to adjust a position of the retainer.

16. The vehicle center console of claim 11, wherein the attachment feature includes the clamping member, and the clamping member includes a first projection extending from the retainer and a second projection extending from the first projection at an angle, wherein the first projection is configured to extend through a first wall aperture of the plurality of wall apertures in response to the attachment feature being moved to an installed position.

17. A method comprising:

disposing a first end of an attachment feature in a wall aperture disposed in an inside sidewall of a center console compartment;

positioning a second end of the attachment feature to extend into a cavity of the center console compartment, and the attachment feature extends through the inside sidewall; and disposing the second end of the attachment feature to extend through an aperture disposed in a retainer whereby the retainer is secured to the inside sidewall;

wherein the attachment feature includes at least one of:

a clamping member configured to clamp to the inside sidewall; or a rubber button fastener configured to couple the retainer to the inside sidewall, wherein each rubber button fastener includes a first flange, a second flange, and a third flange, the inside sidewall is received between the first flange and the second flange, and an attachment portion of the retainer is received between the second flange and the third flange.

18. The method of claim 17, further comprising securing the retainer to the inside sidewall with the attachment feature.

* * * * *